(12) United States Patent
Müller et al.

(10) Patent No.: US 7,014,209 B2
(45) Date of Patent: Mar. 21, 2006

(54) AIRBAG COVER AND METHOD FOR MANUFACTURING AN AIRBAG COVER

(75) Inventors: Henry Müller, Landshut (DE); Christian Schlemmer, Landshut-Münchnerau (DE); Rudolf Aichner, Kirchberg (DE)

(73) Assignee: Lisa Draxlmaier GmbH, Vilsbiburg (DE)

( * ) Notice: Subject to any disclaimer, the term of this patent is extended or adjusted under 35 U.S.C. 154(b) by 24 days.

(21) Appl. No.: 10/615,597

(22) Filed: Jul. 9, 2003

(65) Prior Publication Data

US 2004/0195814 A1    Oct. 7, 2004

(30) Foreign Application Priority Data

Jul. 10, 2002   (DE)   ................ 102 31 131

(51) Int. Cl.
  *B60R 21/20*   (2006.01)
  *B60R 21/205*   (2006.01)
  *B60R 21/213*   (2006.01)

(52) U.S. Cl. .................. 280/728.3; 280/732
(58) Field of Classification Search ............ 280/728.3, 280/731, 732
  See application file for complete search history.

(56) References Cited

U.S. PATENT DOCUMENTS

| | | | |
|---|---|---|---|
| 3,632,136 A * | 1/1972 | Foltz | 280/732 |
| 4,991,870 A * | 2/1991 | Beusterien et al. | 280/732 |
| 5,172,931 A * | 12/1992 | Baba et al. | 280/728.3 |
| 5,181,737 A * | 1/1993 | Lenzen et al. | 280/732 |
| 5,316,822 A | 5/1994 | Nishijima et al. | |
| 5,390,950 A * | 2/1995 | Barnes et al. | 280/728.3 |
| 5,478,106 A * | 12/1995 | Bauer et al. | 280/728.3 |
| 5,496,059 A * | 3/1996 | Bauer | 280/728.3 |
| 5,685,560 A * | 11/1997 | Sugiyama et al. | 280/731 |
| 5,744,776 A | 4/1998 | Bauer | |
| 5,803,489 A | 9/1998 | Nusshoer | |
| 6,106,003 A * | 8/2000 | Rahmstorf et al. | 280/728.3 |
| 6,199,897 B1 * | 3/2001 | Kreile | 280/728.3 |
| 6,224,090 B1 * | 5/2001 | Lutze et al. | 280/728.3 |
| 6,231,940 B1 * | 5/2001 | Aichner et al. | 428/36.2 |
| 6,247,722 B1 * | 6/2001 | Brodi et al. | 280/728.3 |
| 6,440,514 B1 * | 8/2002 | Ueno et al. | 428/43 |
| 6,655,711 B1 * | 12/2003 | Labrie et al. | 280/728.3 |
| 6,709,007 B1 * | 3/2004 | Gray et al. | 280/728.3 |
| 6,918,609 B1 * | 7/2005 | Friery et al. | 280/728.1 |
| 2002/0130497 A1 | 9/2002 | Sommer | |
| 2002/0195800 A1 * | 12/2002 | Florsheimer | 280/728.3 |

FOREIGN PATENT DOCUMENTS

| | | |
|---|---|---|
| DE | 196 16 942 A1 | 11/1997 |
| DE | 196 54 246 A1 | 6/1998 |
| DE | 200 03 365 U1 | 9/2000 |
| DE | 199 35 625 A1 | 2/2001 |
| DE | 100 06 483 A1 | 8/2001 |

(Continued)

*Primary Examiner*—Paul N. Dickson
*Assistant Examiner*—Laura B. Rosenberg
(74) *Attorney, Agent, or Firm*—Sughrue Mion, PLLC

(57)   ABSTRACT

The present invention relates to an airbag cover and a method for manufacturing an airbag cover comprising a first layer (1) which is substantially intact in the region of a tear seam for airbag deployment and which borders the space in which the air-bag deploys if the need arises, and at least a second layer (2) which faces the folded airbag, the second layer (2) being attached to the rear side of the first layer (1) to reinforce said first layer (1) and only the second layer (2) having a weakened region (3) to predetermine the run of the tear seam during the deployment of the airbag.

20 Claims, 4 Drawing Sheets

FOREIGN PATENT DOCUMENTS

| | | |
|---|---|---|
| DE | 100 10 862 A1 | 9/2001 |
| FR | 2 761 940 A1 | 10/1998 |
| JP | 01 202 550 A | 8/1989 |
| WO | WO 00/71341 A2 | 11/2000 |

* cited by examiner

— — —: Layer 1
··········: Layer 2

— — —: Layer 1
··········: Layer 2

— — — —: Layer 1
············: Layer 2

— — — —: Layer 1
············: Layer 2

AIRBAG COVER AND METHOD FOR MANUFACTURING AN AIRBAG COVER

FIELD OF THE INVENTION

The invention relates to an airbag cover and a process for the production of an airbag cover. The airbag cover serves as a cover for the folded airbag which is integrated, for example, into a dashboard or steering wheel of a vehicle.

PRIOR ART

Known from the publication EP 0 639 481 A1 is an airbag cover and a method for manufacturing an airbag cover, the leather which is the top layer of the airbag cover being specifically weakened in the region of the tear seam by a strip so that the airbag cover bursts in this specifically weakened region of the leather should the airbag be inflated, if the need arises, to protect the vehicle occupant.

However, in the case of the apparatus and the method according to EP 0 639 481 A1, the specifically weakened region becomes visible, at the latest under the influence of heat and moisture and at least under a long-term influence, i.e. the seam of the airbag cover in the dashboard or steering wheel becomes more and more visible because of solar radiation and temperature fluctuations in the course of time.

DESCRIPTION OF THE INVENTION

This invention is thus based on the technical problem of providing an apparatus and a method, wherein an invisible seam is produced in the airbag cover, said seam remaining invisible even under the influence of temperature and moisture and long-term ageing, and the functionality of the airbag, i.e. the bursting of the airbag cover as a result of airbag release or inflation, is maintained.

This technical problem is solved by an airbag comprising a first layer which is substantially intact in the region of a tear seam for airbag deployment and which borders the space in which the airbag deploys if the need arises, a second layer which faces the folded airbag wherein the second layer is attached to the rear side of the first layer to reinforce said first layer and the second layer having a weakened region to predetermine the run of the tear seam should the airbag deploy.

The invention is based on the concept that owing to the limited expandability of the two connected layers, i.e. the first layer and the second layer which is attached to the rear side of the first layer, the airbag cover bursts in the area in which only the weakened region of the second layer is located when the airbag is released if the need arises. The forces occurring when the airbag is inflated thus create a major notch effect at this site of the first layer which the weakened region of the second layer borders so that as a result, the run of the tear seam of the airbag cover is specifically predetermined. However, since the first layer is intact and only the second layer predetermines the run of the tear seam, the desired tear seam of the airbag cover remains invisible over a long period of time even if it is exposed to solar radiation and temperature fluctuations. The weakening of the second layer may thus have different embodiments, however, the first layer is unchanged, in particular it has a constant layer thickness.

Thus, no ornamental seams and functional seams which are visible from outside and negatively affect the design of a passenger compartment are required for the airbag cover according to the invention or the method for manufacturing an airbag cover according to the invention. Hence, an airbag cover and a method for manufacturing the airbag cover are provided according to the invention, without an externally visible seam of the airbag cover existing and without the functionality of the airbag being negatively affected.

Advantageous embodiments form the subject matter of the sub-claims. For example, it is advantageous for the second layer to be made of a fabric, a sheet or a fleece material which is attached to the first layer substantially over the entire area. As a result, a simply designed reinforcement of the first layer is obtained, wherein only the second layer is specifically weakened.

If the second layer is attached to the first layer by an adhesive method or is laminated to the first layer, an inexpensive attachment of the second layer to the rear side of the first layer is obtained.

The woven fabric or fleece material is advantageously composed of thermoplastic or thermosetting synthetic materials or of metals, ceramics, glass or natural materials. In addition, the first layer is advantageously made of leather so as to create a particularly esthetic vehicle interior without a visible seam in the airbag cover.

It is also advantageous for the first layer to be made of canvas, artificial leather, textiles, thermoplastic or thermosetting synthetic materials so as to obtain an inexpensive airbag cover having an invisible seam in the region of the tear line.

If the weakened region is formed by at least one recess in the second layer, the airbag cover according to the invention can be produced in a structurally simple and inexpensive manner.

According to a preferred embodiment, the weakened region comprises an electrically conductive element through which, if the need arises, an electric current is passed directly before the deployment of the airbag to weaken the second layer. As a result, an airbag cover is obtained which has no permanent mechanical weakening, the weakened region being given its effect by a linkage with the airbag release only if the need arises.

In order to improve the haptic characteristics, a third layer is advantageously attached to the second layer, which is made of a spacer mesh, a foamed material or a combination of spacer mesh and foamed material.

It is also advantageous for the third layer to have an auxiliary weakened region to increase the notch effect and thus the functionality of the airbag or the airbag cover if the need arises.

According to a preferred embodiment, the second layer or the third layer is provided with a reinforcement strip which faces the folded airbag. Breaking of the bond or the first layer, and thus of an externally visible mark, can hereby be avoided.

It is also advantageous for the first layer to have a weakening along the region of the run of the tear seam so that the run of the tear seam is supported by the weakening of the first layer, the first layer being preferably weakened by cutting or scoring or punching.

According to another advantageous embodiment of the present invention, the run of the weakened region of the second layer is not identical, or is only partially identical, to the run of the weakening of the first layer. Thus, an airbag cover is obtained having an invisible desired tear seam which does not become visible even if the airbag cover is exposed to different forces which might twist or distort the airbag cover.

According to a simply producible embodiment of the present invention, the weakened region of the second layer and the weakening of the first layer extend in a sinuous or zigzag manner.

It is also possible to effectively produce a preferred embodiment of the present invention in which the weakened region of the second layer extends linearly and the weakening of the first layer extends in a sinuous or zigzag manner. In a similar manner, it is advantageous for the weakened region of the second layer to extend in a sinuous or zigzag manner and for the weakening of the first layer to extend linearly.

According to an advantageous method of the present invention a third layer is attached to the second layer to enhance the reinforcement of the first layer and to improve the haptic characteristics of the cover.

If the third layer is provided with an auxiliary weakened region before it is attached to the second layer or after it has been attached to the second layer, this will increase the notch effect on the desired tear seam in the first layer.

It is also advantageous for the first layer to be provided with a weakening before it is attached to the second layer to support the desired tear line.

According to a preferred method of the present invention, the weakening of the first layer is made such that the weakening of the first layer is not identical, or is only partially identical, to the weakened region of the second layer. As a result, an airbag cover is obtained which has an invisible desired tear line which is invisible even if the airbag cover is twisted.

If the first layer is punched to form the weakening and the second layer is punched to form the weakened region, the processing steps can be carried out by a single processing apparatus one after the other or simultaneously.

According to a preferred method of the present invention, the weakened region of the second layer is produced by an electrically conductive element through which, if the need arises, an electric current is passed directly before the airbag is deployed to weaken the second layer. Thus, a mechanical weakening of the airbag cover occurs only directly before the tear seam bursts so as to obtain a mechanically stable airbag cover having an invisible desired tear seam.

BRIEF DESCRIPTION OF THE DRAWINGS

The invention is exemplified below by means of the enclosed figures in which.

DESCRIPTION OF EMBODIMENTS OF THE INVENTION

Figure 1:
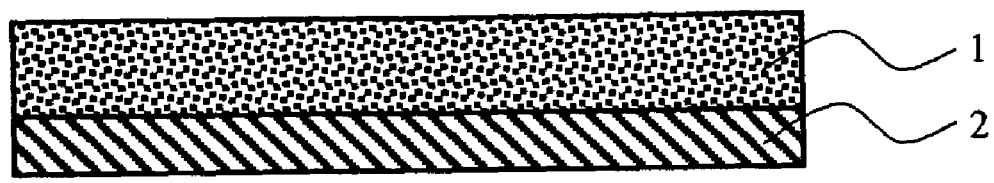
FIG. 1: shows a cross-sectional view of an airbag cover according to the invention without weakened region.
Figure 2:
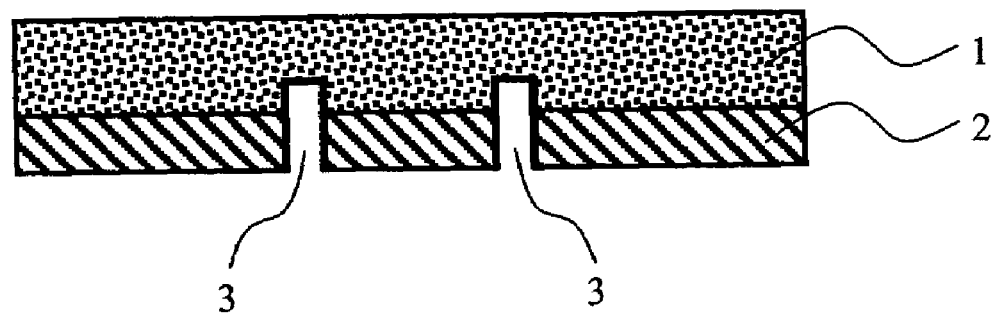
FIG. 2: shows a cross-sectional view of the airbag cover having a weakened region.

FIG. 1 shows a first embodiment of the airbag cover according to the invention, a second layer 2 being attached to the rear side of a first layer 1. The first layer 1 is preferably made of leather which is substantially intact and has an unchanged layer thickness. The second layer 2 in the form of a woven fabric or fleece 2 is attached to the first leather layer 1 by a bonding step or by laminating. Any conventional adhesive can be used for laminating or adhesion, e.g. a hot-melt method being applied or a PU adhesive or a dispersion adhesive being used. This results in a bond of leather and a fabric which has a limited expandability only with respect to the first layer or the leather. Having completed the bond of the leather layer 1 and the fabric layer 2, as shown in FIG. 1, the second layer 2 or the fabric layer 2 is provided with a weakened region 3 as shown in FIG. 2. However, the weakened region 3 of the second layer 2 can also be made before or during the attachment of the second layer 2 to the first layer 1.

In FIG. 2, the weakened region 3 is made in the second layer 2 in the form of recesses 3 which reach up to the first layer 1.

The function of the airbag cover of the invention according to FIGS. 1 and 2 will now be explained below. Having installed the airbag cover, a folded airbag, which is not shown in the figures, borders the second layer 2. If, in the case of an accident, this airbag is released and inflated, a high pressure is applied to the airbag cover. Owing to the weakened region 3 which borders the first leather layer 1, the expandability of the airbag cover is increased and/or the strength is reduced at this site. The run of the tear seam is thus predetermined by the weakened region 3 should the airbag deploy so that the airbag breaks through the airbag cover along the tear line predetermined by the weakened region 3, unfolding into the passenger compartment.

Figure 3:
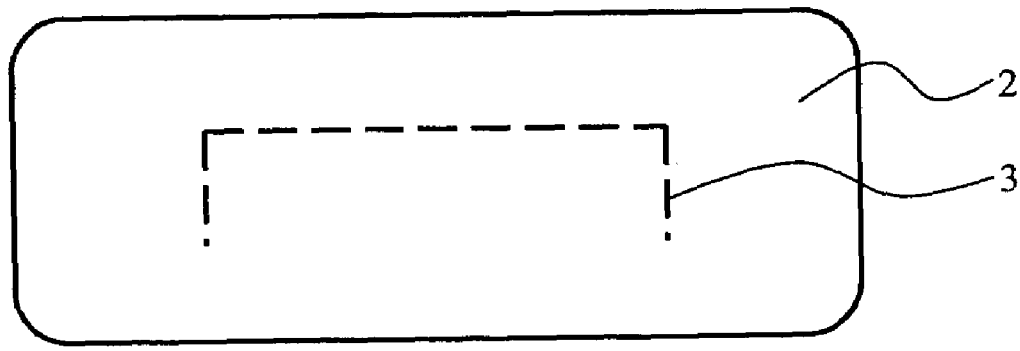
FIG. 3: shows a top view onto the airbag cover of FIG. 2 from below.

FIG. 3 shows the airbag cover of FIGS. 1 and 2 from below, in which the weakened region 3 has a U-shaped run so that part of the airbag cover folds up along the tear seam, which is U-shaped because of the weakened region 3, to enable the deployment of the airbag into the passenger compartment of a vehicle. Owing to the above described notch effect of the weakened region 3 the airbag cover tears open specifically along the run of this weakened region 3. In this connection, the weakened region 3 which is configured as a recess 3 may be formed in the second layer by means of a laser, a knife, a die or a punching tool, without influencing or treating the first layer. Since only the second layer 2 has a weakened region 3 and the first layer 1 is intact, an airbag cover is obtained which has a predetermined tear seam run which is invisible even under the influence of temperature and moisture and long-term ageing, without thereby limiting the functionality of the airbag.

Figure 4:
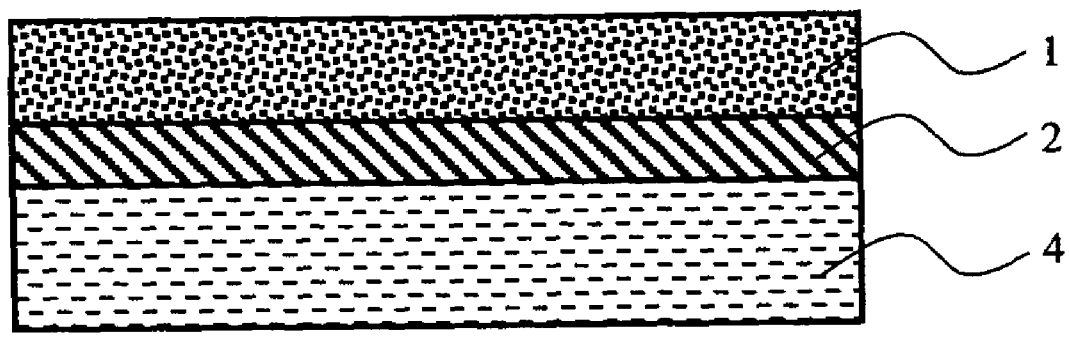
FIG. 4: shows a cross-sectional view of an airbag cover of the invention according to another embodiment having no weakened region.
Figure 5:
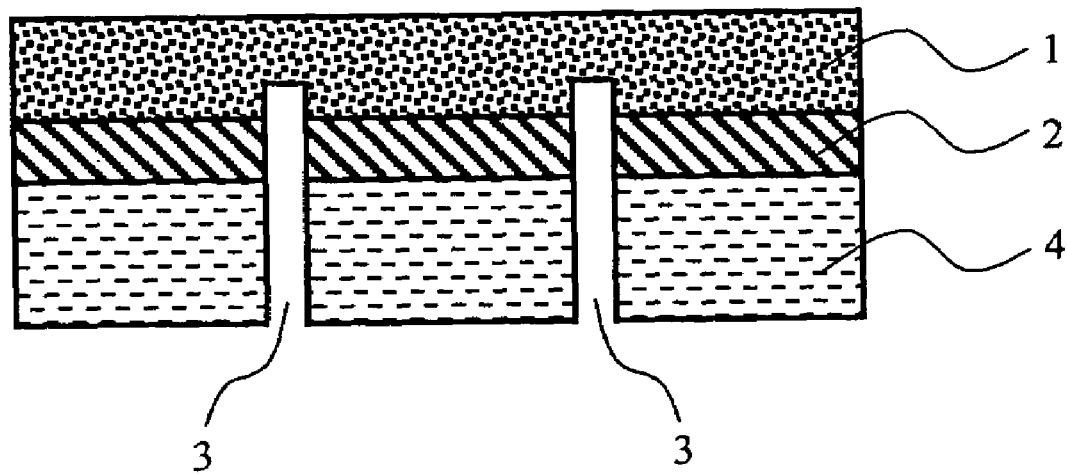
FIG. 5: shows a cross-sectional view of the airbag cover of FIG. 4 having a weakened region.

FIGS. 4 and 5 show a further embodiment of the airbag cover according to the invention. As can be seen from FIG. 4, the second embodiment, unlike the first embodiment of FIG. 1, has a spacer mesh 4 on the rear side of the second layer 2. The spacer mesh 4 may preferably be made of a foamed material to improve the haptic characteristics of the airbag cover. In addition, the strength of the airbag cover is also increased by the spacer mesh 4. The spacer mesh 4 may suitably be attached to the rear side of the second layer 2 before or after the attachment of the second layer 2 to the first layer 1, e.g. by an adhesive method or by laminating, as shown in FIG. 4.

In FIG. 5, the airbag cover according to the second embodiment is provided with a weakened region 3 extending through the second layer 2 and through the spacer mesh 4 before or after the attachment of the second layer 2 to the first layer 1. As shown in FIG. 5, the weakened region 3 is made in the form of recesses 3 which cause a notch effect when the folded airbag is inflated. Since the first layer 1 is unchanged, the desired tear seam along the weakened region 3 also remains invisible in the second embodiment of the airbag cover according to the invention even if temperature fluctuations and solar radiation act on the airbag cover, without negatively affecting the functionality of the airbag, i.e. the tearing open of the airbag cover when the airbag is inflated.

According to an embodiment of the airbag cover of the invention which is not shown, the weakened region can also be produced by an electrically conductive element or an electrically conductive thread in the second layer, through which, if the need arises, an electric current is passed directly before the airbag is deployed to weaken the second layer. As a result, a notch effect is produced in the second layer at the site of the electrically conductive element owing to the reduced strength so that the tear seam of the airbag cover is formed along the run of the electrically conductive element.

According to a further non-illustrated embodiment, the airbag cover according to the invention can be reinforced by an attached strip on the rear side in the zone of the weakened region to avoid breaking the bond of the first and second layers. In addition, the weakened region can also be partially or completely closed on the surface, e.g. by welding, bonding or sewing, to prevent breaking of the airbag cover.

According to a further embodiment of the present invention, the first leather layer can also be laminated to a fabric preformed on a core as the second layer.

According to a preferred embodiment of the airbag cover according to the invention, the first layer is also weakened specifically along the required tear line, e.g. by scoring. The second layer is then laminated thereto, and the second layer is subsequently weakened in a further operating cycle. This weakening of the second layer may be congruent with, or partially congruent with, the weakening of the first layer or may be made at a certain distance, the weakening of the second layer extending in a sinuous or zigzag manner and the weakening of the first layer extending linearly or also in a sinuous or zigzag manner. The weakening may be made, for example, by punching and the second layer can be specifically weakened before both layers are joined with each other. An airbag cover having a specific tear run which is not visible from the outside even under the influence of temperature and moisture and long-term ageing is thus obtained.

Figure 6:
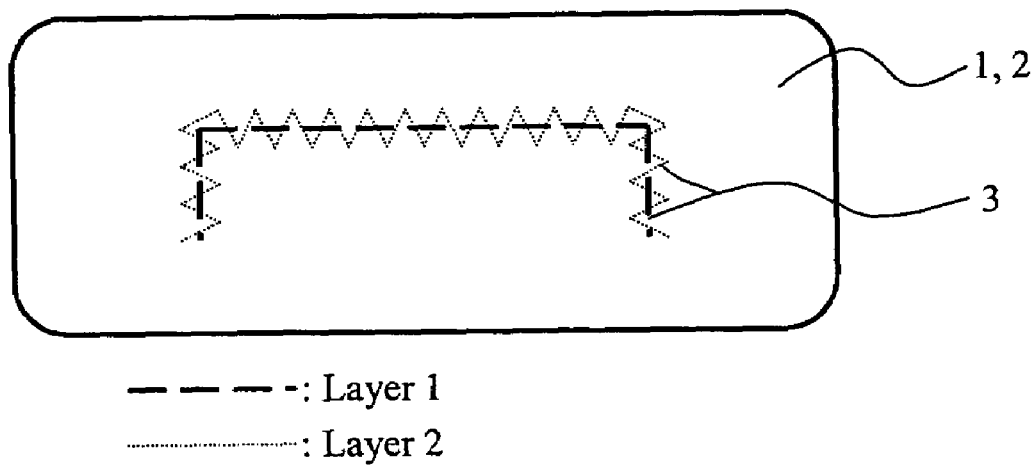
FIG. 6 is a schematic view of the weakened regions of the first and second layers according to a first embodiment.

FIG. 6 is a schematic view of the second layer showing the superimposed weakness patterns for the first and second layers. The inner surface of the first layer is provided with linear scoring shown by heavy lines to define a weakened region. The second layer is provided with a zig-zag through opening shown in light lines which overlies the linear scoring in the first layer.

Figure 7:
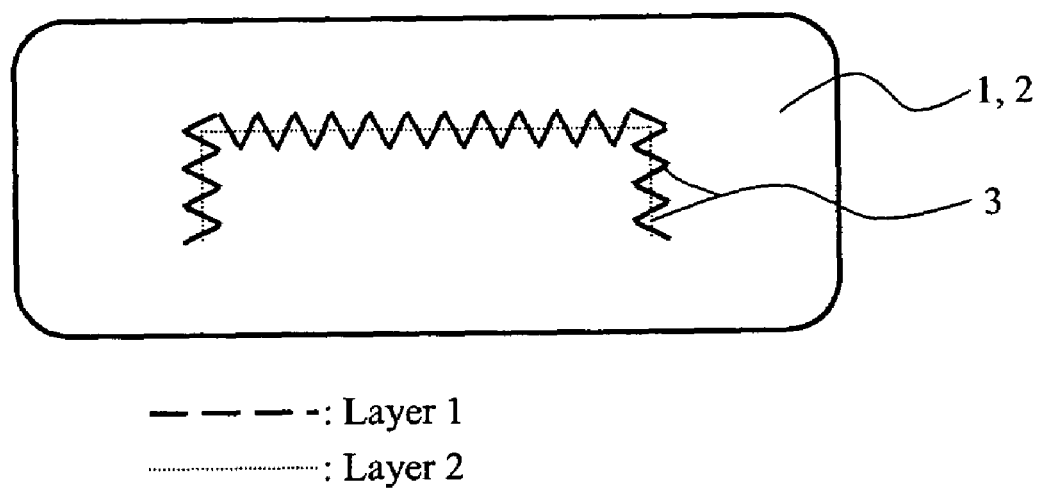
FIG. 7 is a schematic view of the weakened regions of the first and second layers according to a second embodiment.

FIG. 7 is a schematic bottom view of the second layer showing the superimposed weakness patterns for the first and second layers. The inner surface of the first layer is provided with zig-zag scoring showing heavy lines to define a weakened region. The second layer is provided with a linear through opening which overlies the zig-zag scoring in the first layer.

Figure 8:
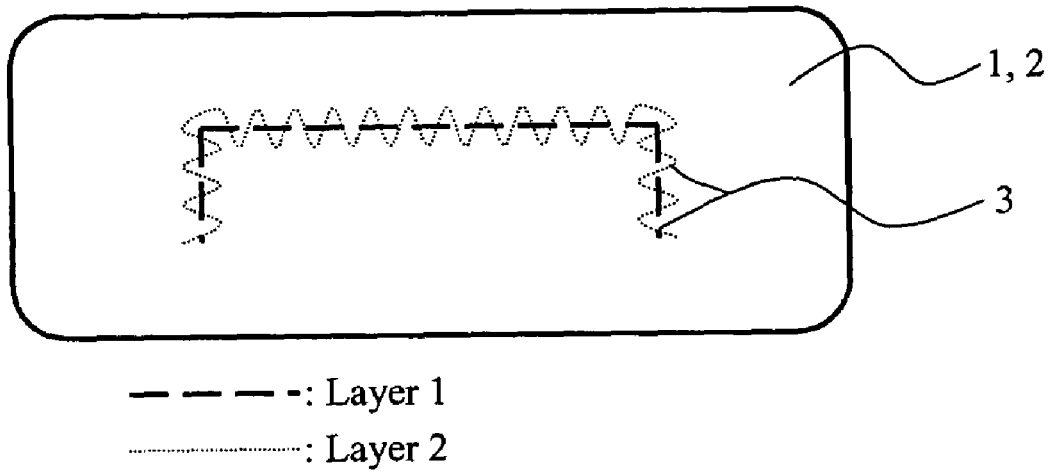
FIG. 8 is a schematic view of the weakened regions of the first and second layers according to a third embodiment.

FIG. 8 is a schematic bottom view of the second layer showing the superimposed weakness patterns for the first and second layers. The inner surface of the first layer is provided with linear scoring shown by heavy lines to define a weakened region. The second layer is provided with a sinuous through opening shown in light lines which overlies the linear scoring in the first layer.

Figure 9:
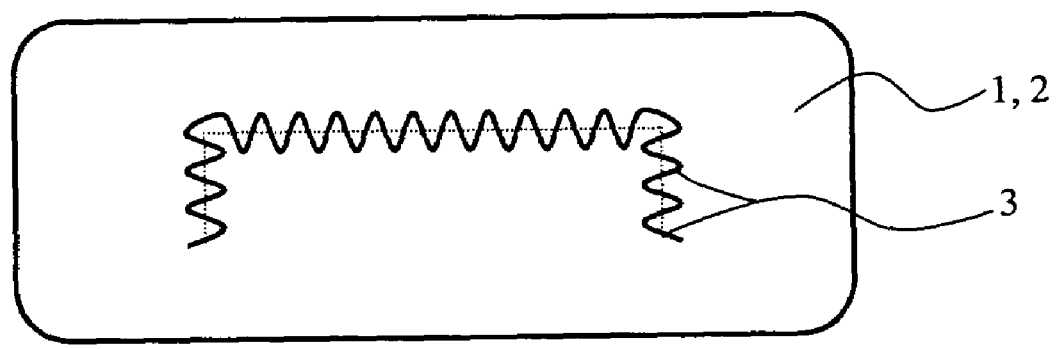
FIG. 9 is a schematic view of the weakened regions of the first and second layers according to a fourth embodiment.

FIG. 9 is a schematic bottom view of a second layer showing the superimposed weakness patterns for the first and second layers. The inner surface of the first layer is provided with sinuous scoring showing heavy lines to define a weakened region. The second layer is provided with a linear through opening which overlies the sinuous scoring in the first layer.

The invention thus describes an airbag cover and a method for manufacturing an airbag cover, comprising a first layer which is substantially intact in the region of a tear seam for the deployment of an airbag and which borders the space into which the airbag deploys if the need arises, and at least a second layer 2 which faces the folded airbag, the second layer 2 being attached to the rear surface of the front layer so as to reinforce the first layer 1 and only the second layer 2 having a weakened region to predetermine the run of the tear seam during the deployment of the airbag.

What is claimed is:

1. An airbag cover comprising a first layer which is substantially intact in the region of a tear seam for airbag deployment which borders on a space in which an airbag deploys if the need arises,
   a second layer attached to an inner surface of the first layer to reinforce said first layer,
   said second layer having an weakened region to determine the run of the tear seam should the airbag deploy,
   wherein the inner surface of the first layer is provided with scoring along the run of the tear seam to define a weakened region of the first layer, and
   wherein the weakened region of the first layer extends in a zigzag manner and the weakened region of the second layer extends linearly.

2. An airbag cover according to claim 1 wherein the first layer and the second layer are secured together by an adhesive.

3. An airbag cover according to claim 1 wherein the first layer is comprised of leather.

4. An airbag cover according to claim 1 wherein the weakened region of the second layer is comprised of a recess.

5. An airbag cover according to claim 1 further comprising a third layer which is attached to the second layer and is provided with a weakened region which is coincident with the weakened region of the second layer.

6. An airbag cover comprising a first layer which is substantially intact in the region of a tear seam for airbag deployment which borders on a space in which an airbag deploys if the need arises,
   a second layer attached to an inner surface of the first layer to reinforce said first layer,
   said second layer having a weakened region in a rear side thereof to determine a run of the tear seam should the airbag deploy,
   wherein the inner surface of the first layer is provided with scoring along the run of the tear seam to define a weakened region of the first layer, and
   wherein the weakened region of the first layer extends linearly and the weakened region of the second layer extends in a zigzag manner.

7. An airbag cover according to claim 6 wherein the first layer and the second layer are secured together by an adhesive.

8. An airbag cover according to claim 6 wherein the first layer is comprised of leather.

9. An airbag cover according to claim 6 wherein the weakened region of the second layer is comprised of a recess.

10. An airbag cover according to claim 6 further comprising a third layer which is attached to the second layer and is provided with a weakened region which is coincident with the weakened region of the second layer.

11. An airbag cover comprising a first layer which is substantially intact in the region of a tear seam for airbag deployment which borders on a space in which an airbag deploys if the need arises,
 a second layer attached to an inner surface of the first layer to reinforce said first layer,
 said second layer having an weakened region to determine the run of the tear seam should the airbag deploy,
 wherein the inner surface of the first layer is provided with scoring along the run of the tear seam to define a weakened region of the first layer, and
 wherein the weakened region of the first layer extends in a sinuous manner and the weakened region of the second layer extends linearly.

12. An airbag cover according to claim 11 wherein the first layer and the second layer are secured together by an adhesive.

13. An airbag cover according to claim 11 wherein the first layer is comprised of leather.

14. An airbag cover according to claim 11 wherein the weakened region of the second layer is comprised of a recess.

15. An airbag cover according to claim 11 further comprising a third layer which is attached to the second layer and is provided with a weakened region which is coincident with the weakened region of the second layer.

16. An airbag cover comprising a first layer which is substantially intact in the region of a tear seam for airbag deployment which borders on a space in which an airbag deploys if the need arises,
 a second layer attached to an inner surface of the first layer to reinforce said first layer,
 said second layer having a weakened region in a rear side thereof to determine a run of the tear seam should the airbag deploy,
 wherein the inner surface of the first layer is provided with scoring along the run of the tear seam to define a weakened region of the first layer, and
 wherein the weakened region of the first layer extends linearly and the weakened region of the second layer extends in a sinuous manner.

17. An airbag cover according to claim 16 wherein the first layer and the second layer are secured together by an adhesive.

18. An airbag cover according to claim 16 wherein the first layer is comprised of leather.

19. An airbag cover according to claim 16 wherein the weakened region of the second layer is comprised of a recess.

20. An airbag cover according to claim 16 further comprising a third layer which is attached to the second layer and is provided with a weakened region which is coincident with the weakened region of the second layer.

* * * * *